C. L. ORSER.
DEVICE FOR PREVENTING THE FREEZING OF WATER PIPES.
APPLICATION FILED NOV. 6, 1912.
1,054,024. Patented Feb. 25, 1913.
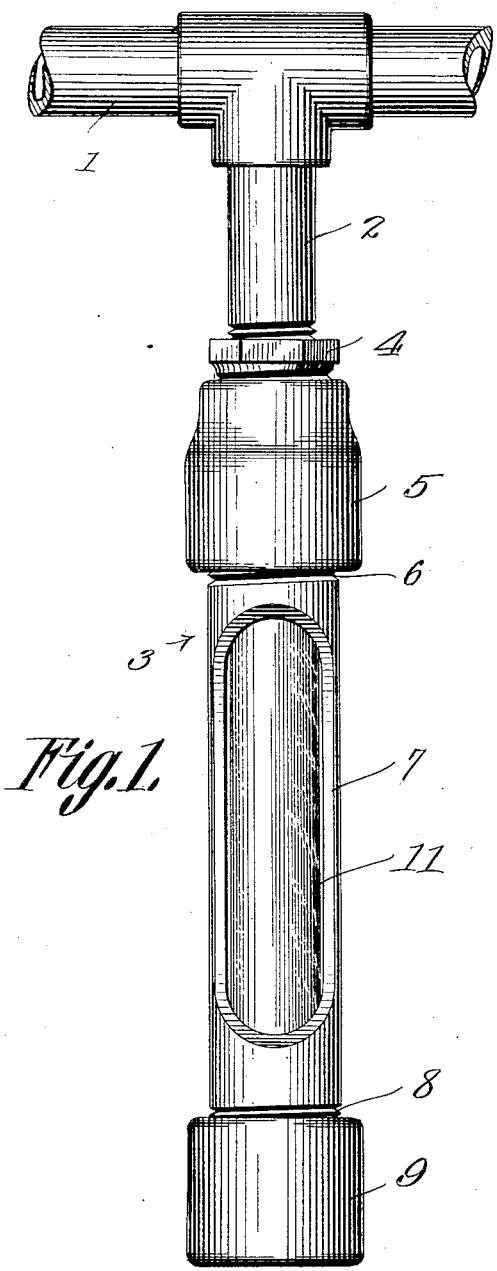
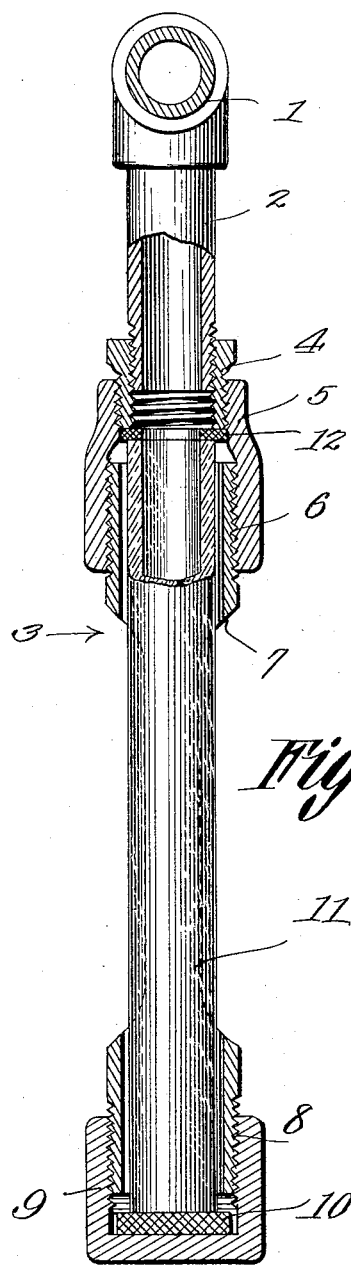
Charles L. Orser
Inventor,
Witnesses

UNITED STATES PATENT OFFICE.

CHARLES L. ORSER, OF FITZGERALD, GEORGIA.

DEVICE FOR PREVENTING THE FREEZING OF WATER-PIPES.

1,054,024.   Specification of Letters Patent.   Patented Feb. 25, 1913.

Application filed November 6, 1912. Serial No. 729,849.

*To all whom it may concern:*

Be it known that I, CHARLES L. ORSER, a citizen of the United States, residing at Fitzgerald, in the county of Ben Hill and State of Georgia, have invented a new and useful Device for Preventing the Freezing of Water-Pipes, of which the following is a specification.

The present invention relates to improvements in a device for preventing the freezing of water under pressure in the main, the primary object of the present invention being the provision of a device adapted to be attached to a main or reservoir, in such a manner that the same will be placed in the most exposed position to be affected by the lowering temperature and contains a water container of less tensile strength than the usual conduit, so that the freezing of the water therein would burst the same to relieve the water pressure and thus prevent freezing in the main or reservoir.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the complete device as connected to a water pipe. Fig. 2 is a longitudinal sectional view through the device at right angles to the position of the same as shown in Fig. 1.

Referring to the drawings, the numeral 1 designates a pipe or conduit which carries water under pressure and which it is desired to protect against freezing, the same having connected thereto by any suitable means, as shown, a nipple 2, the device 3 which will under freezing conditions release the water contained within itself to permit the draining of the conduit 1 or the flowing therethrough of the water so the same cannot be frozen while in motion. This device is supported from the end of the nipple 2 through the means of the bushing 4 which has connected thereto, a coupling member 5 interiorly screw threaded at both ends and having connected in its lower end, the upper end 6 of the tubular frame 7 whose lower threaded end 8 is seated within and engaged by the plug or cap 9.

Mounted within the plug or cap 9 is a washer or gasket 10 which abuts the lower end of the glass tube 11 whose upper end is seated upon the annular gasket or ring 12, which is disposed between the tube 11 and the lower end of the bushing 4. The frame 7 is provided with cut away portions which permit of the observation of the contents of the glass tube 11. As the glass tube 11 is purposely made of less tensile strength than the conduit 1 and nipple 2, it is evident that when disposed in an exposed position that is in a position where it will be affected more by the rise and fall of the temperature than the conduit 1, that the freezing of the water within the tube 11 will cause the bursting or breaking of the tube and consequently the release of the water pressure within the pipe 1 through the nipple 2.

It is apparent that this device may be attached to protect water circulating systems of automobiles and also connections to steam boilers and the like.

It is evident from the foregoing that a very simple means is provided for preventing the freezing of the water within the pipe 1 or any other main or tank that may retain water under pressure, the tube 11 being so disposed and constructed as to be readily broken due to the freezing of the water therein and consequently before such water will freeze within the less exposed pipes 1 or 2.

What is claimed is:

1. A device of the character described, including a fragile tube of less tensile strength than the water conducting pipe, a tubular support surrounding said fragile tube, a metal cap sealing the lower end of the fragile tube and carried by the tubular support, and means connected to the upper end of the tubular support for making a water tight joint at the upper end of the fragile tube and for connecting the device to a water conduit.

2. The combination with a water conduit for containing water under pressure, of a device for preventing the freezing thereof, including a metal supporting member, a coupling member connected to the upper end thereof and for engagement with the water conduit, a fragile tube of less tensile strength than the water conducting pipe mounted concentrically within the supporting member and having its upper end disposed within the coupling of the supporting member, and a cap fitting upon the lower end of the supporting member and sealing the lower end of the tube.

3. The combination with a water conduit for containing water under pressure, of a device for preventing the freezing thereof, including a metal supporting member, a coupling member connected to the upper end thereof and for engagement with the water conduit, a fragile tube of less tensile strength than the water conducting pipe mounted concentrically within the supporting member and having its upper end disposed within the coupling of the supporting member, a cap fitting upon the lower end of the supporting member and sealing the lower end of the tube, and two gaskets, one fitted within the cap at the lower end of the fragile tube and the other within the bushing at the upper end of the fragile tube.

In testimony that I claim the foregoing as my own, I have hereto affixed my signature in the presence of two witnesses.

CHARLES L. ORSER.

Witnesses:
 WM. A. ADAMS,
 H. A. ADAMS.

Copies of this patent may be obtained for five cents each, by addressing the "Commissioner of Patents, Washington, D. C."